United States Patent [19]

Kuramochi

[11] Patent Number: 4,794,947
[45] Date of Patent: Jan. 3, 1989

[54] MASS FLOW CONTROLLER

[75] Inventor: Atsuo Kuramochi, Tokyo, Japan

[73] Assignee: Kabushiki Kaisha Nippon IC (also trading as Nippon IC, Inc.), Tokyo, Japan

[21] Appl. No.: 68,186

[22] Filed: Jun. 30, 1987

[30] Foreign Application Priority Data

Nov. 29, 1986 [JP] Japan ............... 61-183896[U]
May 11, 1987 [JP] Japan ............... 62-69968[U]

[51] Int. Cl.⁴ ............................................. G05D 7/06
[52] U.S. Cl. ................................. 137/486; 137/487.5
[58] Field of Search ............. 137/486, 487.5; 73/202, 73/204; 251/129.18, 129.21

[56] References Cited

U.S. PATENT DOCUMENTS 3,529,620  9/1970  Leiber ................. 251/129.18 X
4,199,981  4/1980  Young ................................ 73/204
4,487,213  12/1984  Gates ................................ 137/486
4,541,610  9/1985  Reynolds ..................... 251/129.21
4,542,650  9/1985  Renken et al. .
4,595,171  6/1986  Torrence ................. 251/129.21 X
4,690,371  9/1987  Bosley ..................... 251/129.21 X

FOREIGN PATENT DOCUMENTS 57-134089  8/1982  Japan .
60-50419  3/1985  Japan .

Primary Examiner—Alan Cohan
Attorney, Agent, or Firm—Wenderoth, Lind & Ponack

[57] ABSTRACT

A mass flow controller includes a mass flow control unit connected to a mid portion of a conduit, the mass flow control unit having a by-pass and a mass flow sensor on the upstream side thereof and a flow regulating valve on the downstream side thereof. The mass flow sensor is communicated with the flow regulating valve through an automatic controlling circuit. The by-pass and the mass flow sensor as well as the flow regulating valve are arranged such that they are successively disposed in series in a straight-line manner from the upstream side to the downstream side of the mass flow control unit.

2 Claims, 4 Drawing Sheets

MASS FLOW CONTROLLER

BACKGROUND OF THE INVENTION

1. Field of the Invention

This invention relates to an apparatus for controlling mass flow of various gases and the like with high precision, and more specifically to a mass flow controller having improvements in a passageway thereof through which gases and the like flow and in assemblage of various parts disposed in such passageway.

2. Description of Related Art

Recently various gases are used in manufacturing processes of, for example, semiconductors, and in this connection the demand for more precisely measuring and controlling flow of the gas used becomes greater.

A mass flow sensor which has been, in general, employed heretofore has such construction, as shown in FIG. 3, that a capillary tube 3 having a diameter of 0.25–0.75 mm is externally provided on a conduit 1 for fluid in order to communicate opposite ends of a by-passed portion 2 positioned inside the fluid conduit 1, and an outer circumferential portion of the capillary tube 3 is wound with a self exothermic resistor 4 made of platinum or the like and which is connected with a bridge circuit. The self exothermic resistor 4 is a temperature sensor which detects a temperature difference between the upstream side and the downstream side of the capillary tube 3 in case of heat generation. When a prescribed amount of a gas is introduced into the capillary tube 3 from the fluid conduit 1, a quantity of heat which is proportional to the mass flow of the gas transfers from the upstream side to the downstream side, whereby values of resistance at a site 4a on the upstream side and a site 4b on the downstream side of the self exothermic resistor 4 differ from one another, and such variation is electrically detected by means of the bridge circuit.

In such mass flow sensor, however, since the self exothermic resistor 4 wound around the outside of the capillary tube 3 as a temperature sensor, the speed of response for detecting change in flow is slow, and it sometimes happens that the speed of response in a flow regulating valve is faster than the former speed of response, so that there occurs so-called overshooting and the like. Furthermore, there is a problem that, since the exothermic resistor 4 usually is maintained at a high temperature of 150° C.–200° C. in order to increase the speed of response in such sensor as described above, a gas flowing through the capillary tube 3 is decomposed thermally during the course of flow, dependent upon the type of such gas, so that a decomposition product adheres to an inner wall or the like of the capillary tube 3, whereby clogging and the like occurs.

There has been developed a mass flow sensor the response of which has been significantly improved with respect to changes in temperature due to a construction that a gas passageway is defined on a silicon chip by utilizing a photolithographic technique, which is a manufacturing technique for semiconductors, a thin film-like temperature sensor is formed in the gas passageway, and the resulting silicon tip is directly disposed in a conduit for fluid, and such mass flow sensor has been put to practical use.

An example of a conventional mass flow controller wherein such mass flow sensor as described above is used is shown in FIG. 4 in which a base block 6 having a filter 5 is mounted on and connected to the midportion of a fluid conduit 1, and a mass flow control unit 7 is vertically disposed at a rearward position of the filter 5 in the base block 6. The mass flow control unit 7 is constructed such that a cylindrical housing 8 is provided with a by-pass 2, a mass flow sensor 10 and a flow regulating valve 11. An inlet port 8b and an outlet port 8c are defined in a reduced diameter portion 8a in the lower portion of the housing 8. These parts are arranged such that the inlet port 8b and the outlet port 8c are communicated with a flow through passage 6b in the base block 6 when the reduced diameter portion 8a of the housing 8 is fitted into a fitting hole 6a provided at the rear of the filter 5 in the base block 6 through an O-ring 12. A valve casing 11a for flow control valve 11 is internally provided at an area extending from an expanded diameter portion 8d of the housing 8 to the reduced diameter portion 8a positioned therebelow. A forward end portion of the valve casing 11a is communicated directly with the outlet side of the flow through passage 6b through the outlet port 8c. An area defined between the valve casing 11a and the reduced diameter portion 8a of the housing 8 is utilized as a gas passageway 13, and gas which passes through the passageway 13 from the inlet port 8b flows through the expanded diameter portion 8d via a communicating hole 11b defined on the upper part of the valve casing 11a. A by-pass casing 2a having an upwardly open shape is rigidly provided on the upper part of the valve casing 11a, and an upper lid 14 of the housing 8 is disposed on the upper part of the by-pass casing 2a. A space defined between the outer circumference of the by-pass casing 2a, the housing 8, the upper part of the by-pass casing 2a and the upper lid 14 is utilized as a gas passageway 15, and gas which passes through the passageway 13 flows into the by-pass casing 2a via the passageway 15. A plurality of by-pass elements are provided together with mass flow sensor 10 in the by-pass casing 2a, and the mass flow sensor 10 is electrically connected to a signal detection terminal 16 disposed on the upper lid 14. The lower end portion of the by-pass casing 2a is communicated with valve casing 11a, an armature 11d having a sealing material 11c at the lower end portion thereof is internally provided in a liftable manner in the valve casing 11a through a spring 17, and an orifice 11e communicating with the outlet port 8c of the housing 8 is defined at the lower position of the armature 11d of the valve casing 11a. Furthermore, an electromagnetic coil 9 is rigidly mounted on the outer circumferential portion of the reduced diameter portion 8a of the housing 8 which is positioned on the outside of the armature 11d, and the armature 11d is arranged to be lifted and lowered by means of a magnetic field generated by the electromagnetic coil 9.

Moreover, the signal detection terminal 16 connected to the mass flow sensor 10 is connected with a flow detection amplifier A, this flow detection amplifier A is connected to a servo amplifier D through a linearization circuit B and an output amplifier C, and the servo amplifier D is connected to the electromagnetic coil 9 through a valve driver E. The servo amplifier D is further connected to a flow rate setting device F, and a flow rate setting signal is compared with a signal which is input from the output amplifier C.

In the above construction, when a prescribed gas is supplied from the inlet side of the fluid conduit 1, the gas passes through the filter 5 in the flow through passage 6b of the base block 6 and flows into the inlet port 8b defined in the housing 8 of the mass flow controller unit 7, and thereafter the gas flows into the by-pass casing 2a through the gas passageway 13, the communicating hole 11b in the valve casing 11a and the gas passageway 15. A part of the gas which flowed into the by-pass casing 2a passes through the mass flow sensor 10, while the remainder passes through the by-pass elements to flow into the valve casing 11a. In this case, the gas supplied is detected by the mass flow sensor 10 as a temperature difference signal and is input to the servo amplifier D as a flow rate output signal via the flow rate detection amplifier A, the linearization circuit B and the output amplifier C. In the servo amplifier D, the flow rate output signal is compared with a flow rate setting signal which has been input from the flow rate setting device F, whereby a corrected signal is delivered to the valve driver E so that suitable electric current is applied to the electromagnetic coil 9. On the other hand, the gas which passes through the by-pass casing 2a and flows into the valve casing 11a passes through the outer circumferential part of the armature 11d and flows into the orifice 11e. In this case, the armature 11d is suitably adjusted to be lifted or lowered by means of the magnetic field of the electromagnetic coil 9 as a function of the corrected signal received from the servo amplifier D. As a result, the flow rate of the gas flowing out to the outlet side of the fluid conduit 1 from the orifice 11e and the outlet port 8c of the housing 8 is controlled to be a value which is very close to a flow rate value which has been preset.

However, since the mass flow control unit 7 is vertically disposed with respect to the fluid conduit 1 in such conventional mass flow controller, the dead volume becomes high. In addition. such conventional mass flow controller is arranged such that the gas which passes through the fluid conduit 1 flows into the inlet port 8b, then the gas rises to pass through the gas passageways 13 and 15 and flows into the by-pass casing 2a, and thereafter the gas passes through the valve casing 11a and flows to the outlet side of the fluid conduit 1 from the outlet port 8c. Accordingly, there arises easily a so-called gas accumulation wherein flowing gas accumulates in the vicinity of the inlet port 8b or the outlet port 8c under the above-mentioned conditions. For this reason, such gas accumulation has been an obstacle in the case of internal gas exchange.

Furthermore, there is such a problem that resistance to gas flow becomes high, because the gas passageways are of complicated construction inside the flow rate control unit 7. Further, such construction of the gas passageways also is disadvantageous from the viewpoint of maintenance.

OBJECTS AND SUMMARY OF THE INVENTION

The objects of the present invention is to reduce as much as possible the dead volume in a joint portion of a mass flow control unit with respect to a conduit for fluid, and to make the construction of a fluid passageway simple, thereby eliminating gas accumulation as well as reducing resistance to gas flow, so that maintenance of such mass flow controller becomes easy.

In order to attain the above objects, the present invention provides a mass flow controller wherein a mass flow control unit is connected to a midportion of a conduit for fluid. Such mass flow control unit is provided with a by-pass and a mass flow sensor on the upstream side thereof, while it is provided with a flow regulating valve on the downstream side thereof. The mass flow sensor is connected with the flow regulating valve through an automatic controlling circuit. The by-pass, the mass flow sensor and the flow regulating valve are arranged such that they are successively disposed from the upstream side to the downstream side in the mass flow control unit. A fluid introduced from an inlet side of the fluid conduit passes smoothly through a simplified fluid passageway of the mass flow control unit to be discharged to an outlet side of the fluid conduit.

BRIEF DESCRIPTION OF THE DRAWINGS

Embodiments of the invention will now be described, by way of example with reference to the accompanying drawings, in which.

DETAILED DESCRIPTION OF THE PREFERRED EMBODIMENTS

Figure 1:
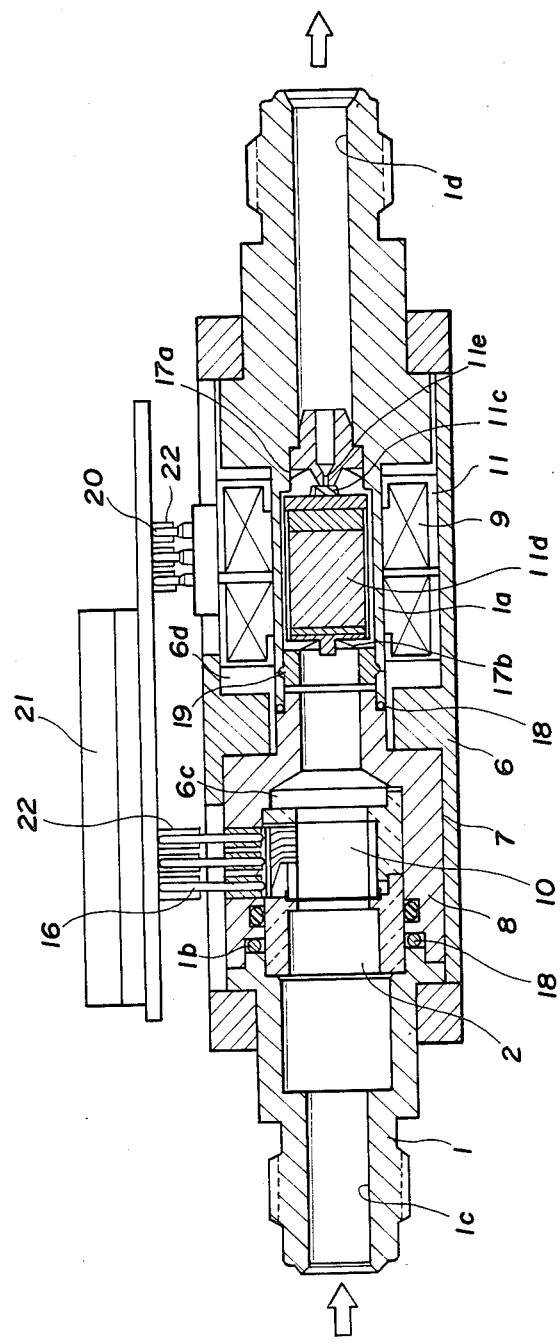
FIG. 1 is a sectional view showing an example of the mass flow controller according to the present invention.

The mass flow controller according to the present invention will be described in detail by referring to FIG. 1. In this connection, it is to be noted that since an automatic controlling circuit part of the mass flow controller according to the present invention is the same as that of a conventional mass flow controller, the detailed description therefor will be omitted herein.

In the mass flow controller of the invention, a base block or housing 6 is disposed on and connected to a prescribed site of a fluid conduit 1 which functions to supply a gas, and a mass flow control unit 7 composed of a series arrangement of a by-pass 2, a mass flow sensor 10 and a flow regulating valve 11 is incorporated in the base block 6. A sensor chamber 6c and a valve chamber 6d are formed inside the base block 6, and a reduced diameter portion 1a extends into the valve chamber 6d. A housing 8 is fitted in and internally disposed in the sensor chamber 6c, and opposite end portions of the housing 8 are joined with an end surface 1b on the inlet side and reduced diameter portion 1a on the outlet side of the fluid conduit 1 through metallic seals 18 in a tight sealing manner.

The by-pass 2 containing a plurality of by-pass elements and a mass flow sensor 10 having ultra-high precision and containing a thin film-like temperature sensor in a silicon tip (most up-to-date model of a conventional sensor) are disposed in series inside the housing 8, and signal detection terminals 16 project upwardly from the mass flow sensor 10 to the outside by passing through the housing 8 and the base block 6.

Furthermore, a member defining an orifice 11e is positioned in reduced diameter portion 1a of the fluid conduit 1 on the outlet side thereof. A spring 17a and an armature 11d are inserted into the reduced diameter portion 1a adjacent orifice 11e, and a spacer ring 19 is fitted within and secured to the reduced diameter portion with another spring 17b. The armature 11d is provided with a valve or sealing member 11c on an end surface thereof on the side of the orifice 11e, and the armature is loosely inserted into the inner circumferential surface of the reduced diameter portion 1a with a prescribed gap, whereby the armature 11d moves freely in the axial direction (the right and left directions in FIG. 1) while the spring force of the springs 17a and 17b acts on the opposite end portions of the armature 11d. Thus, the sealing member 11c is arranged to be freely movable close to and spaced from the orifice 11e. Moreover, an electromagnetic coil 9 is disposed in the valve chamber 6d at a position outwardly of the armature 11d and between the reduced diameter portion 1a and the base block 6. Connecting terminals 20 projecting upwardly from the base block 6 are provided on the electromagnetic coil 9. The flow regulating valve 11 comprises the following respective parts, i.e. the reduced diameter portion 1a, the armature 11d, the sealing member 11c, the springs 17a and 17b, the spacer ring 19, the member defining orifice 11e, and electromagnetic coil 9. Reference numerals 1c and 1d are passage portions on the inlet and outlet sides, respectively.

The signal detection terminals 16 of the mass flow sensor 10 as well as the connecting terminals 20 of the electromagnetic coil 9 are connected to a printed board 21 forming an automatic controlling circuit through respective connectors.

In the above construction, when a prescribed gas is introduced from the passageway of the fluid conduit 1 on the inlet port side, the gas passes through the plurality of by-pass elements in the by-pass 2, and the whole or a part of the gas flows into the mass flow sensor 10. As a result, the mass flow is detected as a temperature difference signal in the mass flow sensor 10, and such resulting signal is input from the signal detection terminals 16 to a flow detection amplifier, a linearization circuit, an output amplifier and a servo amplifier, which are not shown, through the printed board 21 as a flow rate output signal. Then, the flow rate output signal is compared with a flow rate setting signal which has been preset in the servo amplifier, and as a result a corrected signal is delivered from the servo amplifier to a valve driver so that a corrected electric current is applied to the connecting terminals of the electromagnetic coil 9 from the valve driver.

The gas which passes through the mass flow sensor 10 passes through the housing 8, and the gas reaches the orifice 11e from the spacer ring 19 through a gap defined between the armature 11d and the inner circumferential surface of the reduced diameter portion 1a. In this case, the armature 11d is moved in the axial direction thereof a suitable amount by means of the magnetic field generated by the electromagnetic coil 9 depending on the corrected signal from the servo amplifier, whereby the gas which flows to the passage portion 1d of the fluid conduit 1 on the outlet side thereof from the orifice 11e is throttled to complete the adjustment. As a result, the gas flow flowing out from the passage portion 1d of the fluid conduit 1 on the outlet side thereof is controlled to a flow rate which has been preset. The gas which flows from the passage portion 1c of the fluid conduit 1 on the inlet side thereof passes through the by-pass 2, the mass flow sensor 10, the flow regulating valve 11 and the passage portion 1d of the fluid conduit 1 on the outlet side thereof in a substantially straight-line manner. Accordingly, the resistance to flow of the gas decreases, and substantially no gas accumulation or the like occurs. Furthermore, since the interior of the base block 6 is sealed with the metallic seals 18, heat treatment and vacuum processing of the gas can also be employed. In addition, since the armature 11d is of the transverse type, it exhibits strong characteristics with respect to longitudinal vibration of the entire equipment. Thus, there is no dead volume, resistance to fluid flow is extremely small so that gas accumulation or the like scarcely occurs, and maintenance for exchanging parts or the like, is easy.

Next, the second example of the mass flow controller according to the present invention will be described hereunder.

Figure 2:
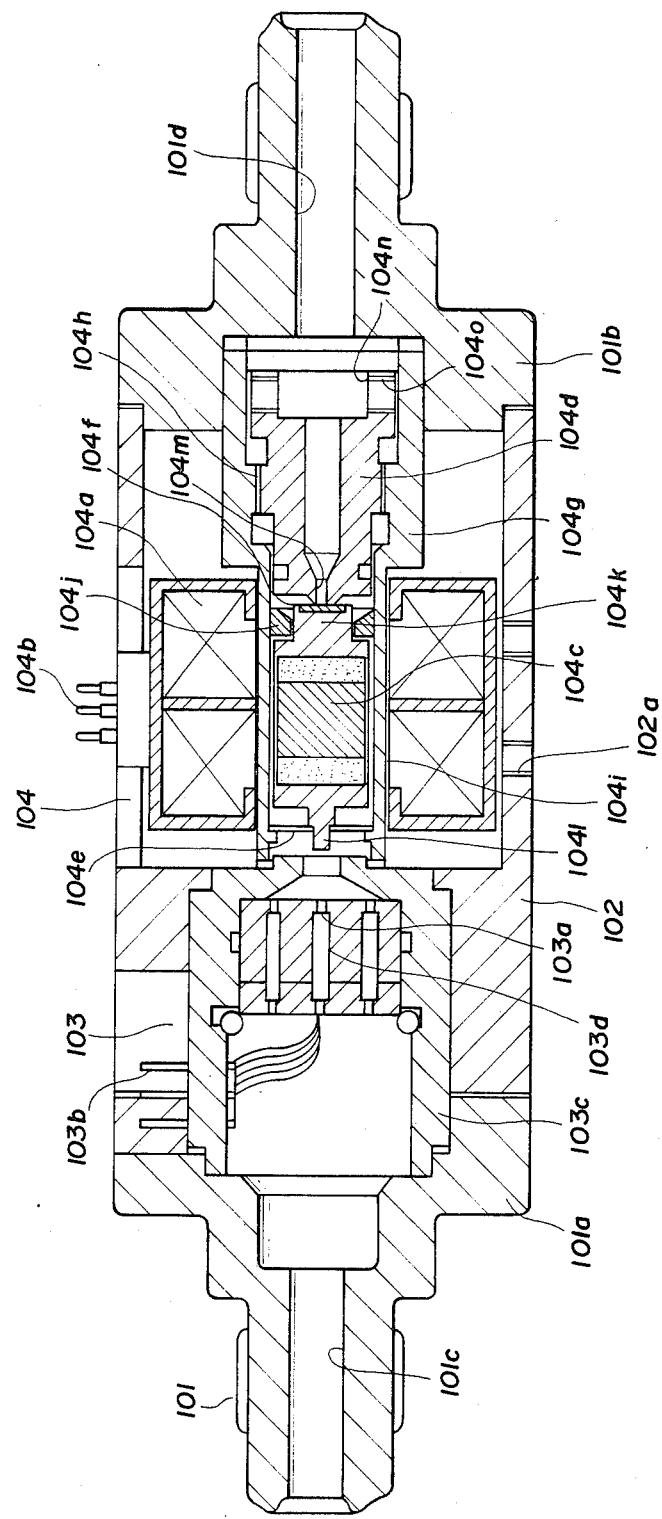
FIG. 2 is a sectional view showing a second example of the mass flow controller according to the present invention.
Figure 3:
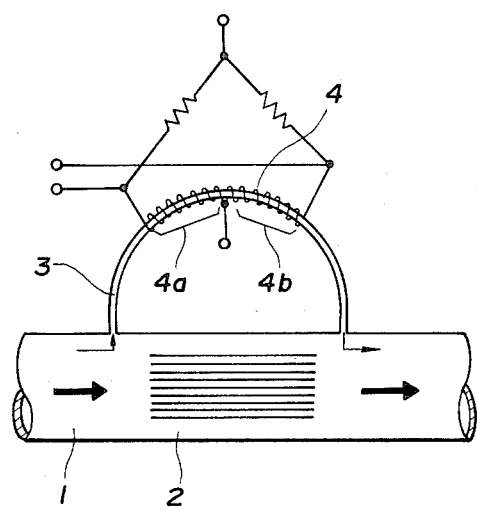
FIG. 3 is a schematic diagram showing a conventional mass flow sensor.
Figure 4:
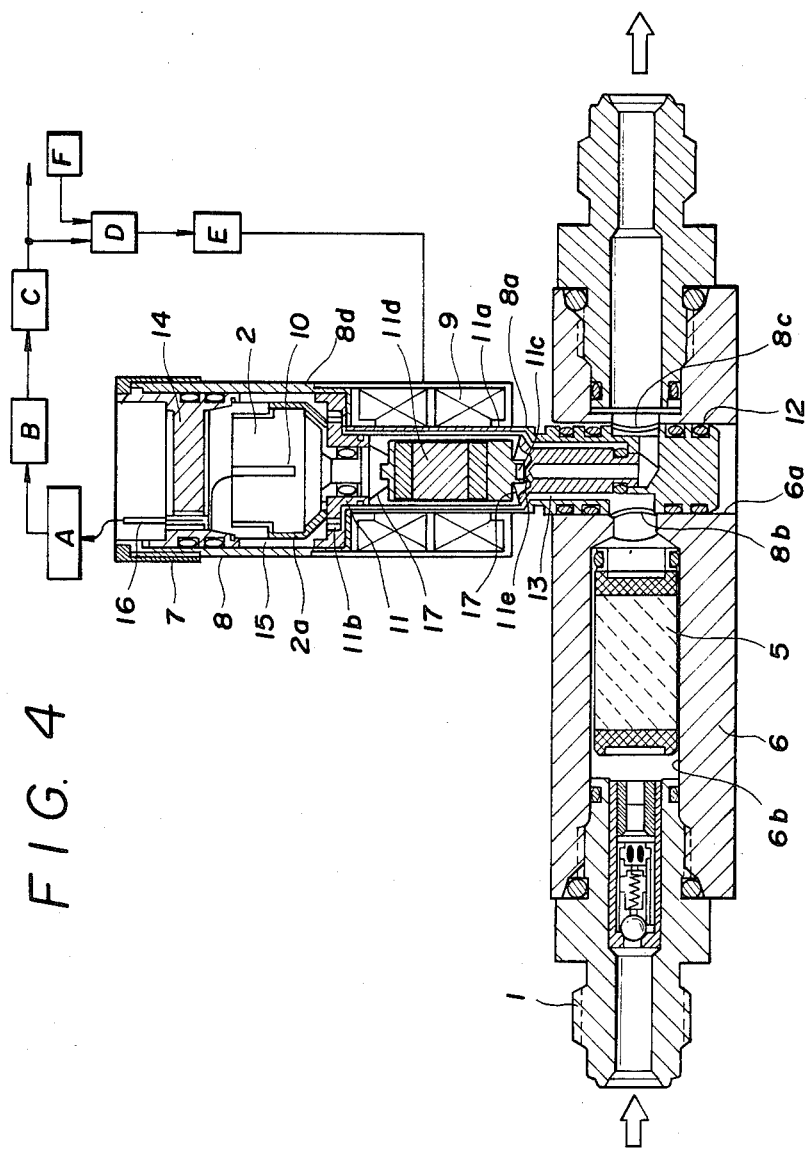
FIG. 4 is a sectional view showing a conventional mass flow controller.

Referring to FIG. 2 wherein reference numeral 101 designates a conduit for fluid, and a base block or housing 102 is connected and interposed between a flange portion 101a on the inlet side (the left side of the drawing) of the fluid conduit and a flange portion 101b (the right side of the drawing) on the outlet side thereof. A mass flow sensor unit 103 and a flow regulating valve 104 are internally disposed in series between the inlet side to the outlet side in the base block.

The mass flow sensor unit 103 is fitted to the base block 102 as a unit and is composed of a casing 103c containing a plurality of by-passes 103d and ultra-high precision sensors 103a (mass flow sensors). Signal detection terminal 103b projects project upwardly to the outside of the base block 102 by passing through the casing 103c and the base block 102.

In the flow regulating valve 104, an armature 104c and an orifice member 104d are internally provided within a casing 104g, and an electromagnetic coil 104a is externally disposed, so that the orifice member 104d and armature 104c are positioned on the outlet side of the casing 104g and the inlet side of the casing 104g, respectively. The electromagnetic coil 104a is placed at the position of the armature 104c around the casing 104g on the inlet side thereof. The casing 104g is internally threaded to form a thread groove 104h at the outlet side thereof, while a formed groove 104i is threaded on the outer circumferential surface on the inlet side thereof. Orifice member 104d and electromagnetic coil 104a are threadably mounted on the thread groove 104h and the thread groove 104i, respectively, in such a manner that they can freely advance and retreat. An annular guide 104j having a gas passageway (not shown) is fitted to the interior of the casing 104g on the inlet side thereof, and a forward reduced diameter portion 104k is slidably held by armature guide 104j. Furthermore, a rearward reduced diameter portion 104l protrudes from the rear end portion of the armature 104c, and such rearward reduced diameter portion is supported on the inner circumferential surface of the casing 104g by a spring 104e. A sealing member 104f confronts an opening 104m of orifice member 104d and is attached to the extreme end surface of the forward reduced diameter portion 104k of the armature 104c. The armature 104c is arranged so as to form a prescribed gap between the outer circumferential surface of armature 104c and the inner circumferential surface of the casing 104g. Armature 104c is held in the casing 104g by means of the armature guide 104j on the forward end side as well as the spring 104e on the rear end side, so that the sealing member 104f is suitably sealed and released or opened with respect to the opening 104m of the orifice member 104d by means of the electromagnetic coil 104a provided on the outer circumferential portion of the casing 104g on the inlet side thereof. Connecting terminals 104b extended from the upper surface of the electromagnetic coil 104a and pass through the base block 102.

Furthermore, the orifice member 104d in the flow regulating valve 104 is provided with an expanded diameter hole 104n at the base portion thereof. A thread groove 104o communicating with expanded diameter hole 104n in the outer circumferential direction thereof is extended to expanded diameter hole 104n, and a fixing screw (not shown) is thread-mounted in thread groove 104o from the inside thereof, thereby fixing the orifice member 104d with respect to the casing 104g. A tapped hole 102a is also bored at a substantially central portion of the base block 102, and a fixing screw (not shown) is screwed into tapped hole 102a from the outside thereof, whereby the electromagnetic coil 104a is fixed with respect to the base block 102.

The mass flow sensor unit 103 is arranged such that the opening portion of the casing 103c on the inlet side thereof faces the passageway 101c in the flange portion 101a, whereby the mass flow sensor unit 103 is connected to the flange portion 101a in a tight condition, and the base block 102 is connected to the flange portion 101a so as to enclose the casing 103c. The flow regulating valve 104 is inserted into the base block 102 from the outlet side thereof, and the casing 104g is joined to the casing 103c in a tight condition such that the opening portion of the casing 104g on the inlet side faces with the opening portion of the casing 103c of the mass flow sensor unit on the outlet side thereof. Furthermore, the casing 104g of the flow regulating valve and the end surface of the base block 102 on the outlet side thereof are joined to the flange portion 101b of the fluid conduit 101 on the outlet side thereof, and the casing 104g is joined to the flange portion 101b in a tight condition such that the opening of the casing 104g on the outlet side faces the passageway 101d of the flange portion 101b. Accordingly, the inside of the base block 102, the passageway 101c on the inlet side and the passageway 101d on the outlet side of the flow conduit 1 are communicated with each other through the casing 103c of the mass flow sensor unit 103 and the casing 104g of the flow regulating valve 104.

Moreover, signal detection terminals 103b projected from the sensor 103a and the connecting terminals 104b projected from the electromagnetic coil 104a are connected to a servo circuit (automatic controlling circuit) through connectors (not shown).

In the above construction, when a prescribed gas is introduced from the flow passage 101c of the fluid conduit 101 on the inlet side thereof, the gas flows into the casing 103c of the mass flow sensor unit 103 and passes through the by-pass 103d and the sensor 103a. As a result, the mass flow is detected in the sensor 103a as a temperature difference signal, such signal is input to the servo circuit from the signal detection terminals 103b, and the resulting signal is compared with a flow rate setting signal which has been preset, whereby a corrected signal is input to the electromagnetic coil 104a of the flow regulating valve 104 as a suitably corrected electric current.

One one hand, the gas which passes through the sensor 103a passes through the opening portion of the casing 103c on the outlet side thereof and flows into the casing 104g of the flow regulating valve 104. The gas flowed into the casing 104g passes through a gap defined between the armature 104c and the casing 104g and flows into the orifice in member 104d. In this case, the armature 104c is transferred in the axial direction thereof by a suitable amount by means of the magnetic field generated by the electromagnetic coil 104a depending on the corrected signal from the servo circuit, whereby the gas flowing from the orifice member 104d to the passageway 101d of the fluid conduit 101 on the outlet side is throttled to adjust the flow rate thereof. As a result, a flow rate of the gas flowing out from the passageway 101d of the fluid conduit 101 on the outlet side is correctly controlled to a flow rate which has been preset. The gas which flows from the passage hole 101c of the fluid conduit 101 on the inlet side passes from the mass flow sensor unit 103 to the flow regulating valve 104 in a substantially straight-line manner. The passage from the sensor 103a to the armature 104c and the orifice member 104d is short, so that the resistance to flow is small, and gas accumulation or the like does not occur.

In the mass flow controller according to the present invention, assembly of the flow regulating valve 104 becomes very important in the manufacturing process in order that mass flow of the flowing gas is controlled with high precision by use of the servo circuit. Such assembly can be effected in such a manner that the armature 104c is attached to the casing 104g, and then the orifice member 104d is assembled with respect to the casing 104g while adjusting the relative positions thereof due to threads 104h. Accordingly, an initial setting position determined by the sealing member 104f of the armature 104c and the opening 104m of the orifice member 104d can be easily and properly adjusted by an operator. In this case, the orifice member 104d is rotated by the operator from the outlet side of the casing 104g to adjust the same in the front and rear positions, and then the orifice member 104d is secured at an optimum position by fastening a fixing screw (not shown) through the tapped hole 104o. Furthermore, the operator rotates the electromagnetic coil 104a by means of threads 104i to adjust the front and rear positions thereof with respect to a range for advancing and retreating movement of the armature 104c, whereby the armature 104c is controlled by the electromagnetic coil 104a in the optimum condition. A fixing screw (not shown) is fastened from the outside through the tapped hole 102a in the base block 102, so that the electromagnetic coil 104a is fixedly positioned with respect to the base block 102 and the casing 104g. When adjusting the assembly of the flow regulating valve 104, advancing and retreating or withdrawn positions of the orifice member 104d and the electromagnetic coil 104a can be minutely adjusted when temporarily fastened to the casing 104g in view of the respective screw threads. Therefore, the flow regulating valve 104 can also be set while a gas flows.

As described above, since an orifice and an electromagnetic coil in a flow regulating valve are screwed to the respective casings in a freely adjustable manner with respect to advancing and retreating or withdrawn positions thereof, the mass flow controller according to the present invention provides the advantage that an initial setting position of the armature and the orifice in the flow regulating valve achieved during manufacture as well as an optimum control range of the armature by means of the electromagnetic coil can be adjusted easily and positively. Moreover, there is also the advantage that adjustment of the flow regulating valve with a high precision becomes possible while a gas flows through the casing, because fine adjustment in the front and rear positions thereof can be effected when the orifice and the electromagnetic coil are fastened temporarily to the casing.

I claim:

1. An apparatus for controlling the mass flow of a gas through a conduit, said apparatus comprising:

a housing having therethrough a longitudinal passage and to be connected to a conduit such that an inlet end of said passage receives gas from the conduit and an outlet end of said passage discharges gas to the conduit;

at least one by-pass within said passage adjacent said inlet end thereof for passing therethrough the gas;

a mass flow sensor positioned within said passage adjacent the outlet of said by-pass for sensing the mass flow of the gas passing through said by-pass and for generating a signal representative thereof;

a flow regulating valve positioned within said passage adjacent said outlet end thereof, said valve comprising a member defining an orifice communicating with said outlet end, and an armature positioned between said sensor and said orifice defining member and having a seal member directed toward said orifice, said armature being movable longitudinally within said passage between a closed position whereat said seal member blocks said orifice and opened positions whereat said seal member is spaced from said orifice;

an electromagnetic coil within said housing at a position surrounding said armature;

automatic control circuit means, connected to said sensor for receiving said signal therefrom and connected to said electromagnetic coil, for energizing said electromagnetic coil to generate a field to move said armature between said closed and open positions thereof, and thereby for controlling the flow of gas through said orifice as a function of the mass flow of gas detected by said sensor; and means for selectively adjusting the respective longitudinal positions of said orifice defining member and said electromagnetic coil within said housing.

2. An apparatus as claimed in claim 1, wherein said adjusting means comprises a reduced diameter cylindrical casing mounted within said housing and having an outlet end adjacent said outlet end of said passage and an inlet end directed toward said sensor, said armature being freely longitudinally movably mounted within said inlet end of said casing, said orifice defining member being adjustably threadedly mounted within said outlet end of said casing, and said electromagnetic coil being adjustably threadedly mounted about said inlet end of said casing.

* * * * *